United States Patent [19]
Burgett

[11] Patent Number: 5,684,911
[45] Date of Patent: Nov. 4, 1997

[54] SUB-SURFACE FIBER OPTIC SPLICE HOUSING AND METHOD OF SPLICING FIBER OPTIC CABLE

[75] Inventor: Mark Edward Burgett, High Point, N.C.

[73] Assignee: Lucent Technologies Inc., Murray Hill, N.J.

[21] Appl. No.: 522,896

[22] Filed: Sep. 1, 1995

[51] Int. Cl.$^6$ .................................................. G02B 6/54
[52] U.S. Cl. ........................................ 385/135; 385/56
[58] Field of Search ................................. 385/135, 134, 385/138, 139, 49, 100, 56

[56] References Cited

U.S. PATENT DOCUMENTS

| | | | |
|---|---|---|---|
| 5,133,038 | 7/1992 | Zipper | 385/135 |
| 5,434,945 | 7/1995 | Burek et al. | 385/135 |
| 5,440,665 | 8/1995 | Ray et al. | 385/135 |
| 5,450,517 | 9/1995 | Essert | 385/135 |
| 5,491,766 | 2/1996 | Huynh et al. | 385/100 |

FOREIGN PATENT DOCUMENTS 2113865   8/1983   United Kingdom ................ 385/135

OTHER PUBLICATIONS

Instruction guide of the 8980-07 Series Splice Encapsulation Kit, Issue 3, published by 3M Corporation, Feb., 1982.

Primary Examiner—John D. Lee
Assistant Examiner—Ellen Eunjoo Kang

[57] ABSTRACT

A splice housing assembly for joining together at least two fiber optic cables. The splice housing assembly has a housing adapted to create a water impervious seal around both a splicing chamber and at least two fiber optic cables that lead into the splicing chamber though the housing. Within the splicing chamber, the various fiber optic cables are joined together via a grounding block or by a direct optical splice. The housing provides structural integrity, electrical insulation and water tightness to the splice, yet the housing can be selectively opened and closed. As a result, any splice can be made and tested, then repaired or adjusted before the housing is permanently sealed with an encapsulation compound.

11 Claims, 9 Drawing Sheets

SUB-SURFACE FIBER OPTIC SPLICE HOUSING AND METHOD OF SPLICING FIBER OPTIC CABLE

GOVERNMENT CONTRACT

Portions of the invention set forth herein were developed as part of a Government Contract No. N00039-91-C-0017, awarded by the Department of Navy. As a result, the United States of America as represented by its various departments and agencies may have certain rights in this patent.

BACKGROUND OF THE INVENTION

1. Field of the Invention

The present invention relates to a splice housing assembly for use when splicing fiber optic cable. More particularly, the present invention relates to splice housing assemblies for use with fiber optic cable in an underwater environment and the associated method of splicing fiber optic cable using such splice housing assemblies.

2. Statement of the Prior Art

In telecommunications, fiber optic cables have become the standard transmission line through which information is sent. In the field of fiber optics, there are many different types of wires and cables that are used for telecommunications. Many such wires and cables are "armored", meaning that the fiber optic element(s) within the wire or cable have a metal sheathing contained within the casing of the wire or cable. Samples of such armored cables are the Deep Water Trunk (DWT) fiber optic cable and the Medium Armor Trunk (MAT) fiber optic cable, commonly used in Fixed Distribution System Under Water Segment (FDS-UWS) telecommunications lines.

When one armored fiber optic cable is spliced to another, two types of splice interconnections must be made. First, the various fiber optic elements within the cable must be spliced together. However, the metal sheathing contained within the cable must also be spliced so as to protect the electrical ground integrity of the cable from one end to the other. In the prior art, the splicing of armored fiber optic cables was performed by first splicing together the various fiber optic elements. After the fiber optic elements were spliced, a metal strip was placed across the spliced region from one cable to another. The metal strip was then coupled to the metal sheathing contained within each cable. The fiber optic splices and metal strip were then enclosed in a casing and potted with an encapsulation compound, in order to make the new union water tight. Such a prior art splicing technique is set forth in the instruction guide of the 8980-07 Series Splice Encapsulation Kit, Issue 3, Feb. 1982, published by 3M Corporation.

The problem associated with such prior art splicing devices and techniques is that the potting compound is required to make the splice structurally sound, electrically insulated and water proof. As a result, the potting compound had to be poured over the splice and cured before the splice could be tested. If the splice needed to be repaired or elements readjusted, the splice housing assembly had to be cut away from the cables and the splicing procedure redone with a new splice housing assembly. It is not that uncommon for a newly made splice to need readjustment or some form of correction. As such, a need exists in the art for a fiber optic cable splice housing assembly that can be adjusted and repaired without having to be replaced.

It is therefore an objective of the present invention to provide a fiber optic splice housing assembly that provides structural integrity, electrical insulation and water proof protection to a fiber optic splice, yet is readily reopenable for adjustments and repairs.

It is a further object of the present invention to provide a method of joining fiber optic cables using a new reopenable splice housing assembly.

SUMMARY OF THE INVENTION

The present invention is a splice housing assembly for joining together at least two fiber optic cables. The splice housing assembly has a housing adapted to create a water impervious seal around both a splicing chamber and at least two fiber optic cables that lead into the splicing chamber through the housing. Within the splicing chamber, the various fiber optic cables are joined together via a grounding block or by a direct optical splice. The housing provides structural integrity, electrical insulation and water tight protection to the splice, yet the housing can be selectively opened and closed. As a result, any splice can be made and tested, then repaired or adjusted before the housing is permanently sealed with an encapsulation compound.

If the fiber optic cables being joined contain metal sheathing within their casings, the metal sheathings are also joined within the splice housing assembly. Connectors are contained within the housing of splice housing assembly. The connectors are adapted to engage the fiber optic cables and electrically contact the metal sheathing of those fiber optic cables. The connectors are interconnected by a wire lead contained within the housing, thereby providing electrical continuity from one fiber optic cable to another. All interconnections between the fiber optic cables and the splice housing assembly are made to be selectively removable. As a result, if any corrections or repairs are warranted, the repair can be readily made without having to recut the fiber optic cables and retry with a new splice housing assembly. Should testing show the splices to be adequate, the splice housing assembly is adapted to receive an encapsulation compound, thereby permanently sealing the splices contained within the assembly.

BRIEF DESCRIPTION OF THE DRAWINGS

For a better understanding of the present invention, reference is made to the following description of exemplary embodiments thereof, considered in conjunction with the accompanying drawings, in which:

FIG. 4 is shown with selective fragmentation to better illustrate internal components.

FIG. 6 is shown with selective fragmentation to better illustrate internal components.

FIG. 7 is shown with selective fragmentation to better illustrate internal components.

DETAILED DESCRIPTION OF THE INVENTION

Although the present invention splice housing assembly and method can be used to join a variety of different types of fiber optic cables, the present invention is especially suited to connect Deep Water Truck (DWT) fiber optic cable and Medium Armor Trunk (MAT) fiber optic cable such as those commonly used in Fixed Distributed System—Underwater Segment (FDS-UWS) telecommunication lines. Accordingly, the present invention splice housing assembly will be described in conjunction with four different embodiments wherein a DWT fiber optic cable is joined to a MAT fiber optic cable; multiple DWT fiber optic cables are joined to a single MAT fiber optic cable; and two applications where a DWT fiber optic cable is joined to the same type DWT cable.

Figure 1:
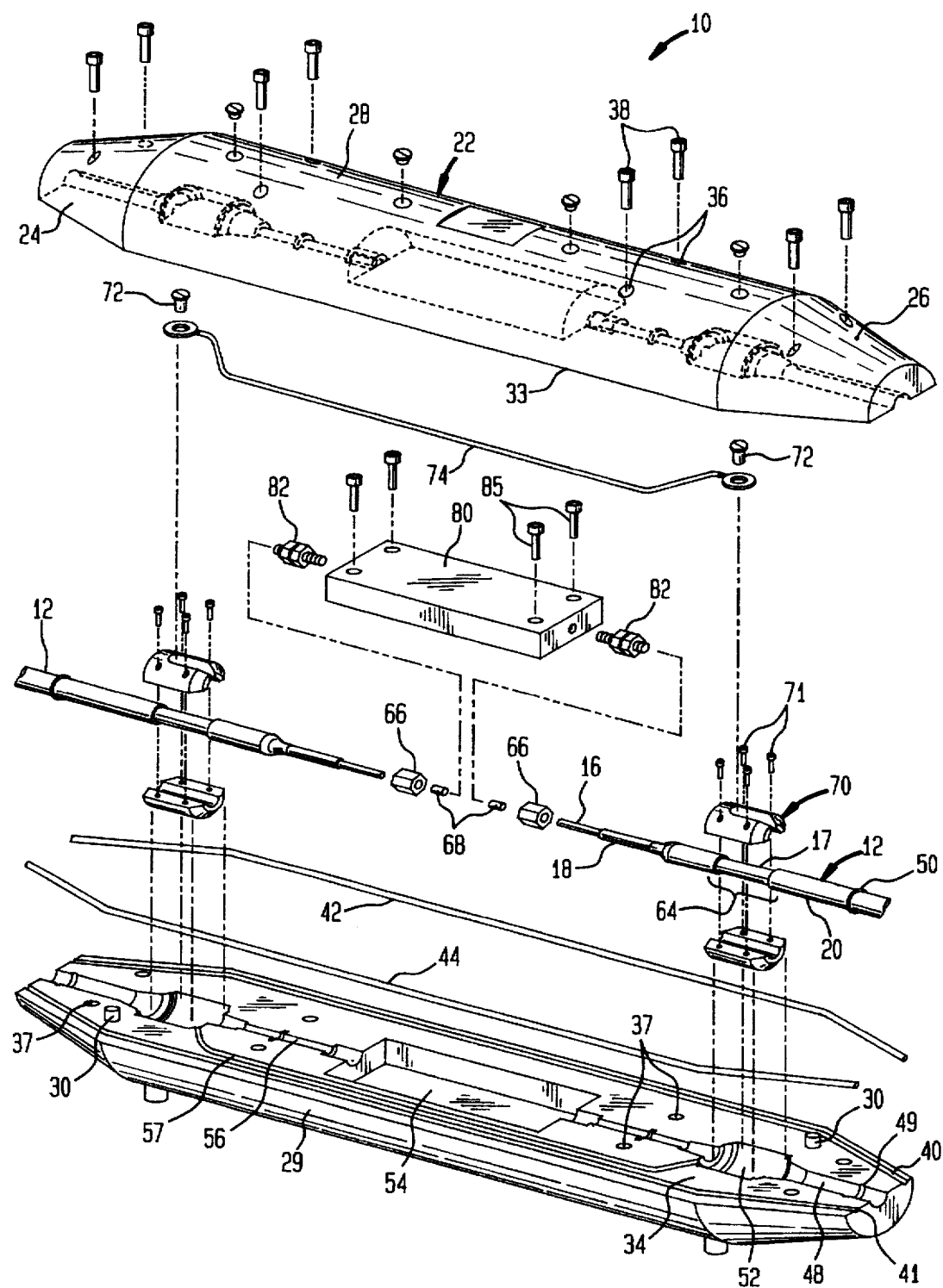
FIG. 1 is an exploded perspective view of one preferred embodiment of the present invention splice housing assembly in an application where two DWT fiber optic cables are being joined.

Referring to FIG. 1, a first preferred embodiment of the present invention splice housing assembly 10 is shown for use in an application where two sections of DWT fiber optic cable 12 are to be spliced together. DWT fiber optic cable 12 has a fiber optic element surrounded by a layer of copper 16. The copper layer 16 is itself surrounded by a first layer 18 of polyethylene that is typically color coded white. The first polyethylene layer 18 is surrounded by a metal sheath 17, which provides a degree of armor to the overall cable. A second layer 20 of polyethylene covers the metal sheath 17, wherein the second polyethylene layer 20 is typically color coded black.

The splice housing assembly 10 includes an elongated housing 22 having tapered ends 24, 26 that taper towards the DWT fiber optic cable 12 entering the housing 22. The housing 22 is divided longitudinally across its mid-section, thereby dividing the housing into two generally equal halves 28, 29. Alignment pins 30 are disposed on the top surface 34 of the bottom housing half 29. The alignment pins 30 pass into the alignment holes (not shown) on the bottom surface 33 of the top housing half 28 as the two halves 28, 29 of the housing 22 are joined, thereby ensuring that the two halves 28, 29 are properly aligned when joined. Screw apertures 36 are disposed through the top housing half 28 that align with threaded bores 37 in the bottom housing half 29. A plurality of threaded fasteners 38 pass through the screw apertures 36 and engage the threaded bores 37, thereby mechanically joining the top housing half 28 to the bottom housing half 29. Two grooves 40, 41 are formed on the top surface 34 of the bottom housing half 29 and on the bottom surface 33 of the top housing half 28. Two elastomeric gaskets 42, 44 lay within the grooves 40, 41, wherein the gaskets 42, 44 create water impervious seals when compressed between the top housing half 28 and the bottom housing half 29.

By the use of compressible gaskets 42, 44 and threaded fasteners 38, it should be understood that the housing 22 can be selectively opened and closed at will. As will later be explained, this enables a splice connection within the housing to be checked, adjusted and/or repaired before the splice is potted. This is a significant improvement over prior art splice housing assemblies that permanently seal around a splice, thereby requiring the splice housing to be cut away and replaced if adjustments or corrections are needed.

As can be seen from FIG. 1, a complex pattern of reliefs are formed into the top surface 34 of the bottom housing half 29 and on the bottom surface 33 of the top housing half 28. When the two halves of the housing 22 are assembled, the reliefs align to form enclosures that extend from one end of the housing 22 to the other. The enclosures change shape to accommodate various components which will later be explained. Proximate both ends of the housing 22, elongated cable enclosures 48 extend inwardly into the housing 22. The cable enclosures 48 are sized to receive the DWT fiber optic cable 12 that extends into the housing 22. O-ring grooves 49 are formed near both ends, wherein the O-ring grooves 49 receive an O-ring 50 that passes over the DWT fiber optic cable 12. When the housing 22 is assembled, the two halves 28, 29 of the housing 22 compress the O-ring 50, thereby making a fluid impervious seal between the DWT fiber optic cable 12 and the housing 22.

The cable enclosures 48 communicate with enlarged coupling chambers 52. The two coupling chambers 52 connect to a large central chamber 54, via smaller conduits 56. A secondary conduit 57 interconnects the two enlarged coupling chambers 52 along a path that travels to the side of the large central chamber 54 and the smaller conduits 56. The purpose and shape of each section of the enclosures within the housing 22 will be explained with the following description of the various components that fit within the different enclosure sections.

Figure 2:
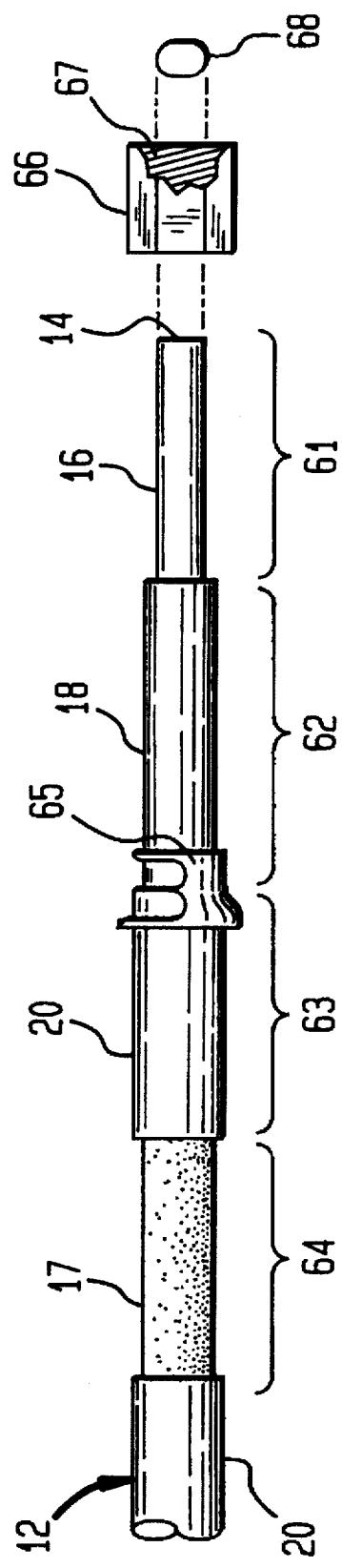
FIG. 2 is a side view, with partial fragmentation, illustrating the preparation of a DWT fiber optic cable for use in the splice housing assembly of FIG. 1.

Referring to FIG. 2, it can be seen that the DWT fiber optic cable 12 is prepared before it is joined within the present invention splice housing assembly. In preparation for splicing, two segments of DWT fiber optic cable 12 are first cleanly cut, thereby producing two free ends. The DWT fiber optic cable 12 is then cleaned using isopropyl alcohol and wipe. In the preferred embodiment, lint-free cotton twill wipes that meet military specification MIL-C-24671 are used. The cable should also be inspected for surface scratches and nicks with a magnifier prior to proceeding with the splicing operation. In preparing the free ends of the DWT fiber optic cable 12, selected sections of the various sheathing layers around the DWT cable 12 are removed. In a first section 61 proximate the free end of the DWT cable 12, the two polyethylene layers 18, 20 and the metal sheathing 17 are removed, exposing approximately 1.5 inches of the copper layer 16 surrounding the fiber optic element 14. In a second section 62, adjacent the first section 61, the outer polyethylene layer 20 and the metal sheathing 17 are removed, exposing the inner polyethylene layer 18. A third section 63, adjacent the second section 62 remains untouched. However, in a fourth section 64 adjacent the third section 63, the outer polyethylene layer 20 is removed to expose the metal sheathing 17. In the preferred embodiment, the metal sheathing 17 is exposed within a region that extends approximately between 5.75 inches and 7.25 inches from the free end of the cable. An annular segment of shrink wrap material 65 is passed over the free end of the DWT cable 12 and positioned on the cable so that the shrink wrap material 65 equally covers a portion of the second section 62 and the third section 63 of the prepared cable. The shrink wrap material 65 is heated and joined to the DWT cable 12 at this position. The shrink rap material 65 isolates the exposed ends of the metal sheathing 17 that occur at the transition between the second section 62 and the third section 63 of the prepared cable.

A coupling nut 66 is passed over the free end of the prepared DWT cable 12. The coupling nut 66 is sized to fit over the first section 61 of the prepared cable but not the second section 62 of the prepared cable. As a result, the coupling nut 66 abuts against the second section 62 of the prepared cable at the transition point between the first section 61 and the second section 62. The coupling nut 66 defines an internal threaded region 67. A compression sleeve 68 is passed over the free end of the DWT cable 12 and onto the first section 61, wherein the compression sleeve 68 is sized to fit within the internal threaded region 67 of the coupling nut 66.

The metal sheathing 17 in the fourth section 64 of the prepared cable is plated with a conductive material that is non-corrosive, such as gold. In order to plate the metal sheathing 17 exposed in the fourth section of the prepared cable, the metal sheathing 17 is first cleaned with an abrasive paper to remove any residual coatings that may be surrounding the metal. The exposed metal sheathing 17 is then cleaned with a degreasing solvent and is electroplated using a portable electroplating system. Portable electroplating systems and methods capable of depositing gold onto the metal sheathing of a cable are well known in the art of cable splicing. Any such prior art system and method may be used in the preparation of the DWT cable 12 in accordance with the present invention.

Returning to FIG. 1, it can be seen that a two-piece coupler 70 joins over the newly plated fourth section 64 of both pieces of the DWT fiber optic cable 12. The two halves of the coupler 70 are joined together by a plurality of threaded fasteners 71. The two-piece coupler 70 is conductive and electrically couples to the fourth section 64 of the DWT fiber optic cable 12 when joined around that section of the cable. A conductive screw 72 extends into the two piece coupler 70 making physical and electrical contact with the two-piece coupler 70, and thus the fourth section 64 of the DWT Fiber optic cable 12. A conductive lead 74 is joined between the two conductive screws 72 in both of the two piece couplers 70. The conductive lead 74 lay within secondary conduit 57 that extends between the enlarged coupling chambers 52 within the housing 22. As a result, when the splice housing assembly 10 is fully assembled, the metal sheathing 17 contained in both pieces of DWT fiber optic cable 12 are electrically connected via the two piece couplers 70, conductive screws 72 and the conductive lead 74.

A grounding block 80 is provided in the center of the splice housing assembly 10. Grounding block are commonly used in fiber optic splicing and any prior art grounding block technology can be used. Two connector fitting 82 are joined to opposite sides of the grounding block 80, wherein the grounding block 80 provides an optical path between the two connector fitting 82. The free ends of both pieces of DWT fiber optic cable 12 are passed through the connector fitting 82 until the coupling nuts 66 positioned along the first region 61 of each DWT fiber optic cable 12 engage the connector fitting 82. As the coupling nuts 66 tighten upon the connector fitting 82, the compression sleeve 68 is compressed and mechanically engages the copper layer 16 surrounding the fiber optic element within the cable. As a result, the fiber optic element within both pieces of DWT fiber optic cable 12 become optically and mechanically coupled via both the grounding block 80 and the fittings that lead into the grounding block 80. Once the fiber optic elements within the DWT fiber optic cable 12 are joined by the grounding block 80, the grounding block 80 is mechanically joined to the bottom housing half 29, via mounting screws 85. After the grounding block 80 is properly anchored, the top housing half 28 is joined to the bottom housing half 29 and the assembly is ready to be potted.

Figure 3:
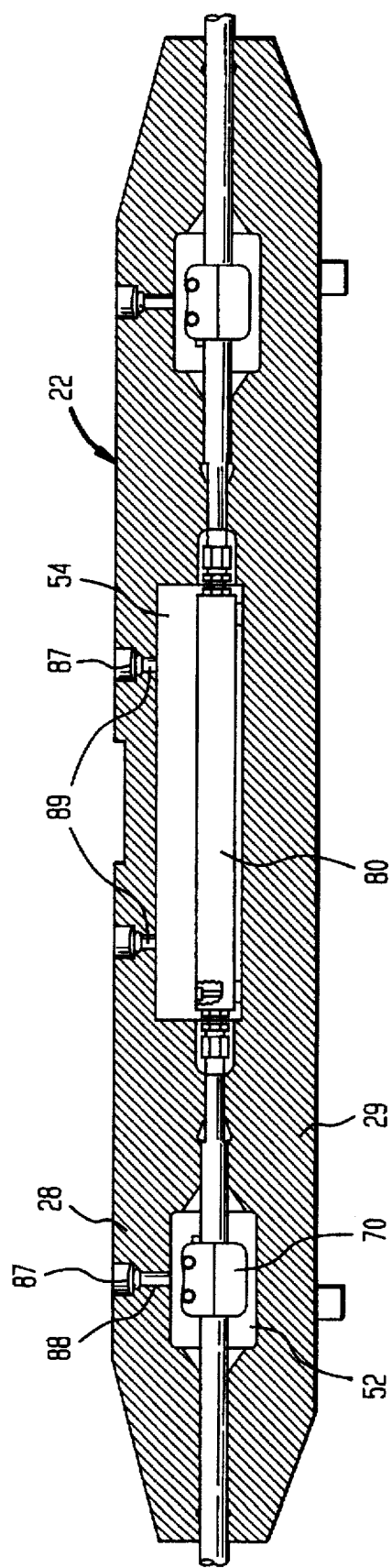
FIG. 3 is a cross sectional view of the splice housing assembly of FIG. 1.

Referring to FIG. 3, it can be seen that the two piece couplers 70 lay within the enlarged coupling chambers 52 defined between the top housing half 28 and the bottom housing half 29. A filling port 88 extends into each of the coupling chambers 52, enabling a potting fill to be added to the chambers. Similarly, the grounding block 80 is contained within the large central chamber 54 of the housing 22. Two filling ports 89 extend into the central chamber 54 to enable potting fill to be added to that chamber.

Although the present invention splice housing assembly 10 is fully assembled and ready for the addition of potting compound, the housing 22 can still be opened and repairs or adjustments made. As a result, a fiber optic splice can be tested prior to the addition of poring compound, whereby corrections could be easily made prior to potting. This differs significantly from prior art splicing devices that cannot be reopened and require potting compounds to be added and cured before the splice can be tested.

Once it has been determined that the splice was properly made and no adjustments are required, a potting compound (not shown) is poured into the various filling ports 88, 89. The poring compound encapsulates the grounding block 80 as well as both of the two piece couplers 70. Fill port caps 87 are then fit into the filling ports 88, 89 completing the assembly.

Figure 4:
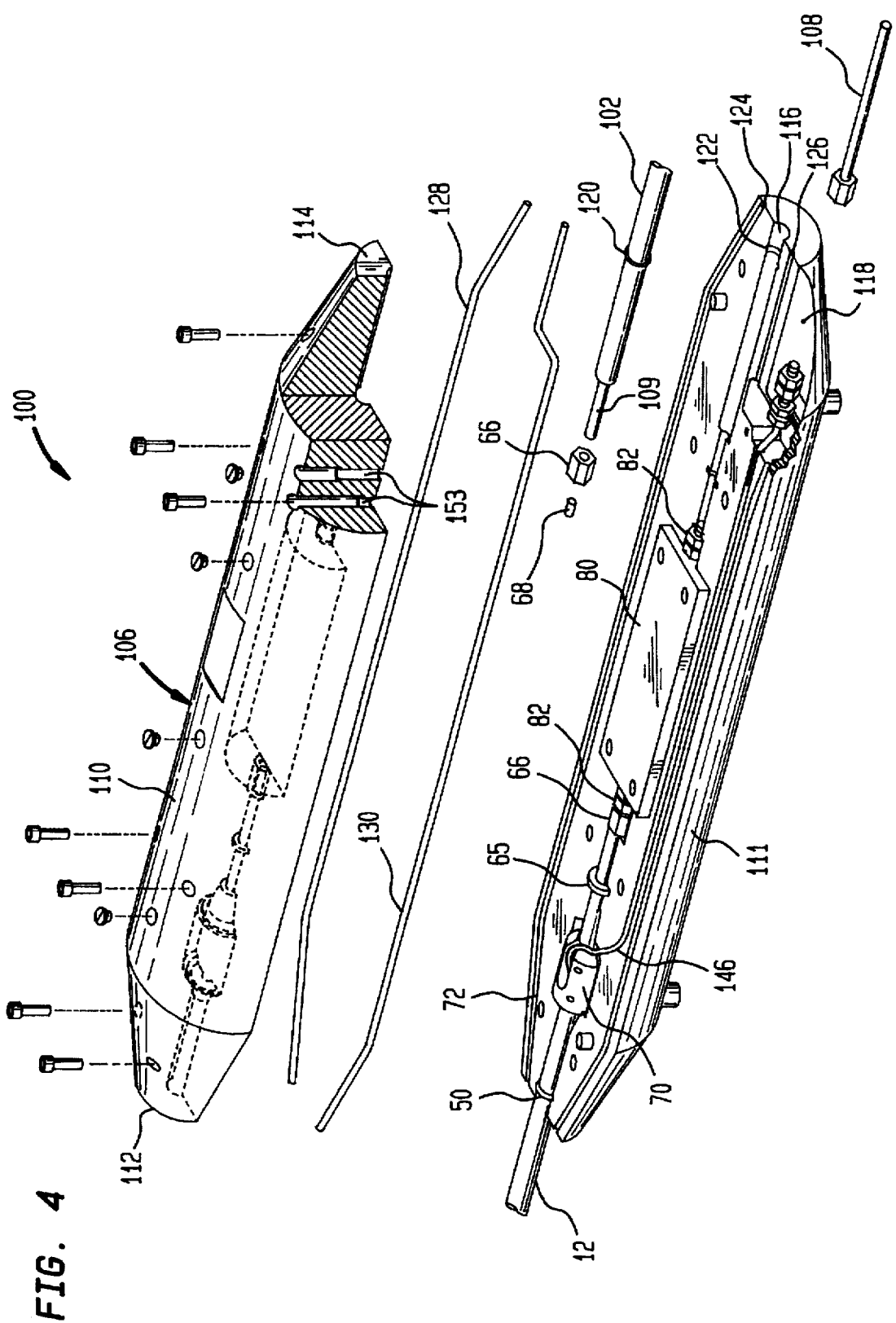
FIG. 4 is an exploded, perspective view of a second preferred embodiment of the present invention splice housing assembly, in an application where a DWT fiber optic cable is joined to a MAT fiber optic cable.

Referring to FIG. 4, an alternate embodiment of the present invention splice housing assembly 100 is shown, wherein the splice housing assembly 100 is designed to join a DWT fiber optic cable 12 to a MAT fiber optic cable 102. Since the embodiment of FIG. 4 shares many of the same components as does the embodiment of FIG. 1 previously described, the components shared by the embodiment of FIG. 4 will be identified with the same reference numerals that are used in FIG. 1.

From FIG. 4, it can be seen that the coupling of the DWT fiber optic cable 12 to the splice housing assembly 100 is identical to the embodiment of FIG. 1 previously described. The DWT fiber optic cable 12 is prepared in the same manner, wherein an O-ring 50, shrink wrap 65, two piece coupler 70, compression sleeve and coupling nut 66 are joined to the DWT fiber optic cable 12. The DWT fiber optic cable 12 is then joined to the grounding block 80 by passing the flee end of the DWT fiber optic cable 12 through the connector firing 82 that extends from the grounding block 80. The coupling nut 66 is then threaded onto the connector fitting 82, thereby joining the DWT fiber optic cable 12 to the grounding block 80. The primary difference with the embodiment of FIG. 4 is that only half of the housing 106 is adapted to receive a DWT fiber optic cable 12 in the previously described manner. The opposite side of the housing is adapted to receive an MAT fiber optic cable 102 and a monel wire 108 that leads to the armor ground terminal (not shown) of the MAT fiber optic cable 102.

As with the previous embodiment, the housing 106 is divided longitudinally into two halves 110, 111. When assembled, the housing 106 is an elongated structure having two tapered ends. At the DWT end 112 of the housing 106, there is only one opening through which the DWT fiber optic cable 12 passes. However, at the MAT end 114 of the housing 106, two openings are provided. The first opening 116 is concentric with the opening on the DWT end 112 of the housing 106 and is adapted to receive the MAT fiber optic cable 102. The second opening 118 is eccentrically positioned on the MAT end 114 of the housing 106 and is sized to receive the monel wire 108.

The two halves 110, 111 of the housing 106 join together to form a water tight structure. An O-ring 120, sized for the MAT fiber optic cable 102, is placed around that cable. The O-ring 120 enters a groove 122 formed on both halves 110, 111 of the housing 106. Both halves 110, 111 of the housing 106 compress and seal with the O-ring 120 when the housing 106 is assembled. Two gasket grooves 124, 126 are also formed on both halves 110, 111 of the housing 106. Elastomeric gaskets 128, 130 are positioned within the gasket grooves 124, 126, wherein the housing halves 110, 111 compress and seal with the gaskets 128, 130 when assembled.

The MAT fiber optic cable 102 is prepared for splicing by removing approximately 1.5 inches of the cable's sheathing proximate its free end, thereby exposing copper layer 109 surrounding the fiber optic element within the cable. A coupling nut 66 is placed onto the cable and advanced into abutment with the remaining sheathing. A compression sleeve 68 is advanced over the copper layer 109 and the free end of the MAT fiber optic cable 102 is advanced into the connector fitting 82 extending from the grounding block 80. The coupling nut 66 is threaded onto the connector fitting 82, thereby compressing the compression sleeve 68 and mechanically joining the MAT fiber optic cable 102 to the grounding block 80. The grounding block 80 optically couples the fiber optic element within the MAT fiber optic cable 102 to the fiber optic element within the DWT fiber optic cable 12.

Figure 5:
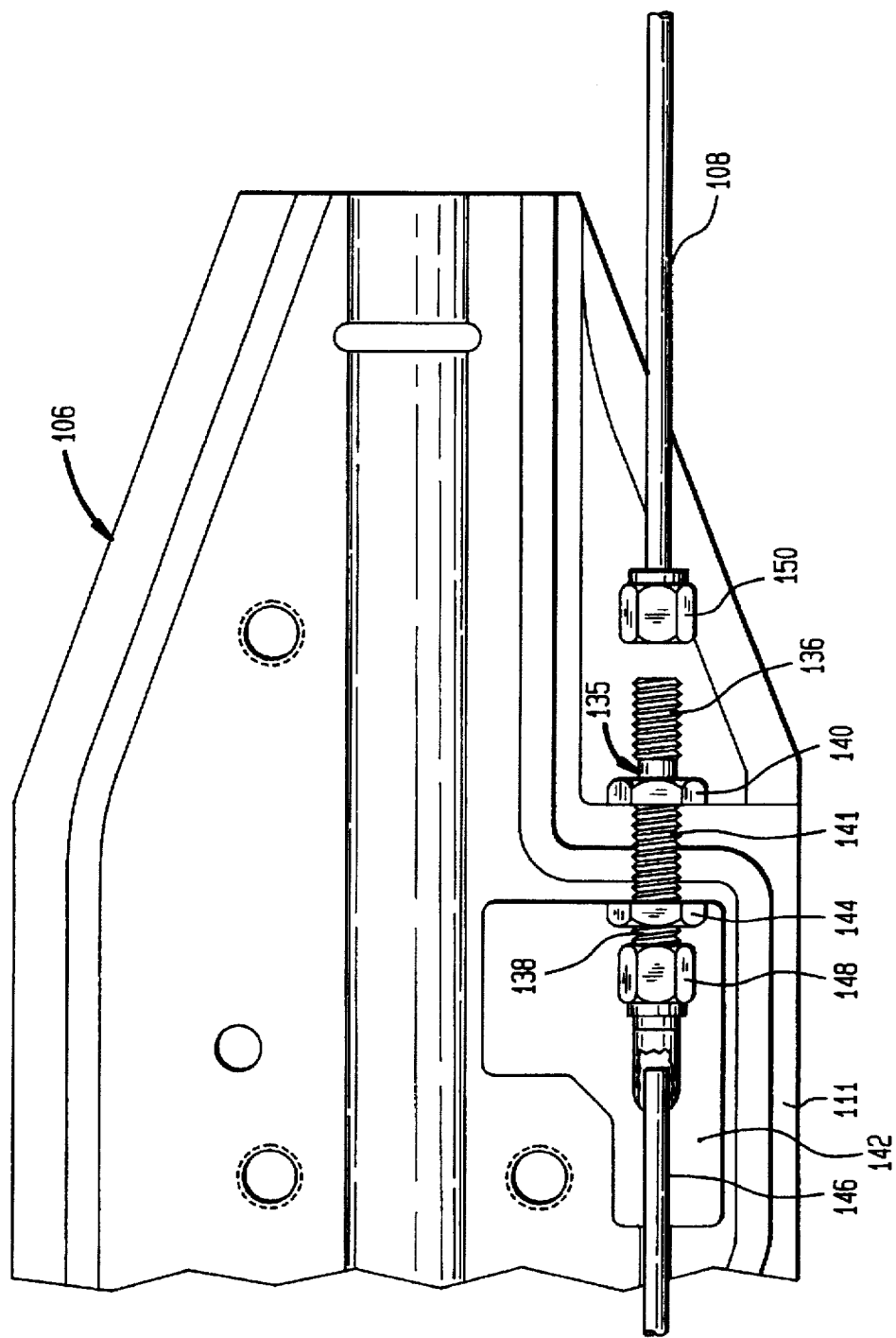
FIG. 5 is a top view of a portion of the bottom housing half of the splice housing assembly shown in FIG. 4.

Referring to FIG. 5, it can be seen that the monel wire 108 couples to a union tube bulkhead 135. The union tube bulkhead 135 is a conductive element having a threaded nipple 136 at one end, a threaded shaft 138 at the opposite end and an integral nut-shaped flange 140 disposed proximate the threaded nipple 136. The threaded shaft 138 passes through a bore 141 in the bottom half 111 of the housing 106 and extends into an enlarged connection chamber 142. The nut-shaped flange 140 is tightened until in direct abutment with the bottom half 111 of the housing 106. A locking nut 144 is then threaded onto the threaded shaft 138 retaining the union tube bulkhead 135 into a set position. A conductive lead 146 is provided having a female fitting 148 at one end and an eyeloop at the opposite end. The female fitting 148 tightens onto the threaded shaft 138 thereby coupling the conductive lead 146 to the union tube bulkhead 135. The monel wire 108 also terminates in a female fitting 150. The monel wire female fitting 150 tightens onto the threaded nipple 136 of the union tube bulkhead 135, thereby joining the monel wire 108 to the conductive lead 146. Returning to FIG. 4, it can be seen that the conductive lead 146 is joined to the two-piece coupler 70 by a conductive screw 72. As has previously been explained, the conductive screw 72 also joins the lead 146 to the metal sheathing within the DWT fiber optic cable 12, thereby electrically coupling the monel wire 108 to the metal sheathing of the DWT fiber optic cable 12.

Once assembled and the splicing complete, the housing 106 still can be opened and all connections repaired or adjusted. As a result, the splice can be tested prior to the addition of a potting compound and corrections can be made as a result of that testing. Once it has been determined that the splice was properly made and no adjustments are required, a potting compound (not shown) is poured into the various filling ports. In the shown embodiment, a filling port 153 leads into the connection chamber 142, wherein the connection between the conductive lead 146 and the union tube bulkhead 135 is potted. After the potting compound is cured, fill port caps are placed over the filling port and the assembly is complete.

Figure 6:
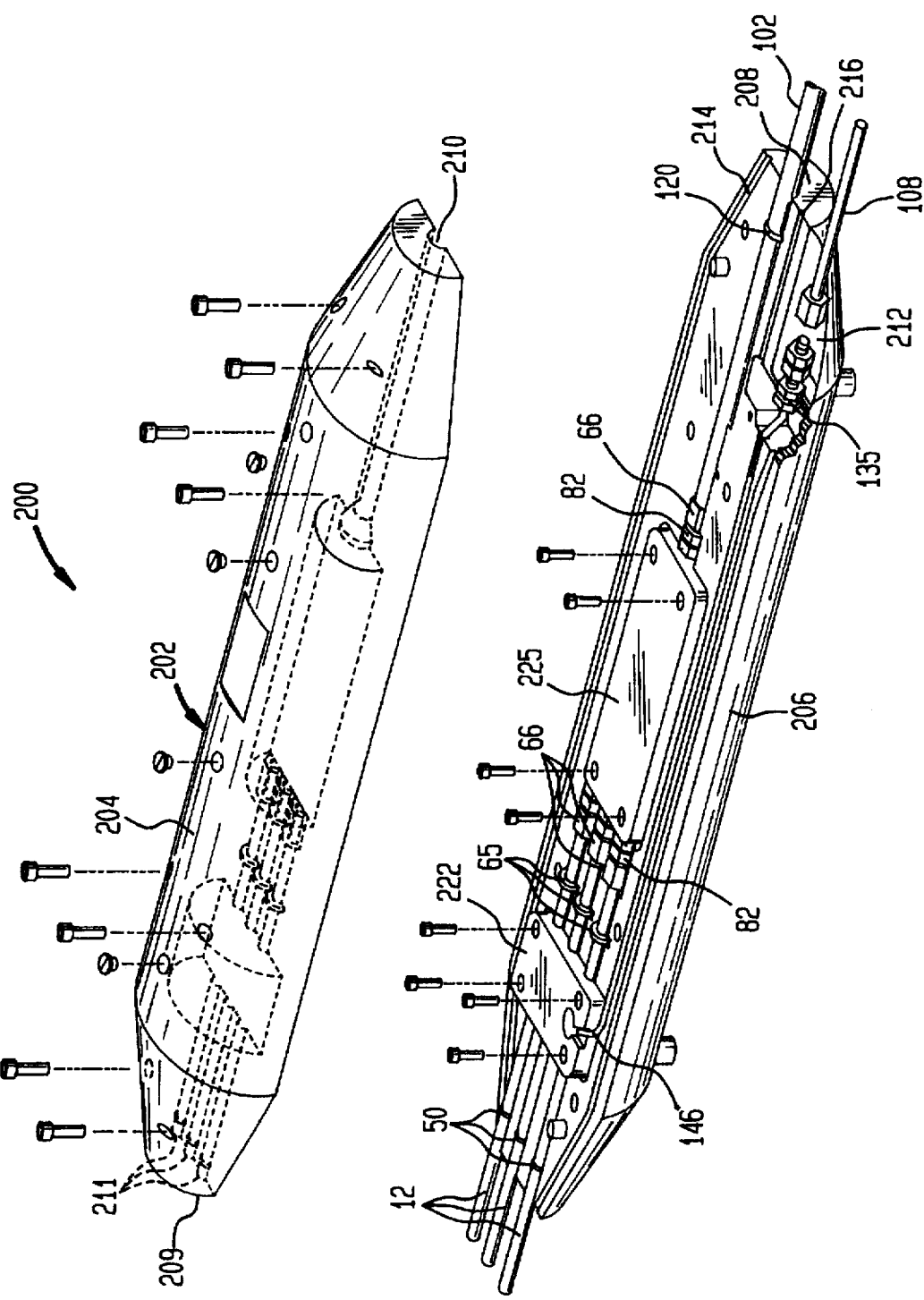
FIG. 6 is an exploded, perspective view of a third preferred embodiment of the present invention splice housing assembly, in an application where three DWT fiber optic cables are being joined to a single MAT fiber optic cable.

Referring to FIG. 6, a third embodiment of the present invention splice housing assembly 200 is shown, wherein the splice housing assembly 200 is designed to join multiple DWT fiber optic cables 12 to a single MAT fiber optic cable 102. Since the embodiment of FIG. 6 shares many of the components with the embodiments of FIGS. 1 and 4 that were previously described, the components shared by the embodiment of FIG. 6 will be identified with the same reference numerals that were used in FIGS. 1 and 4.

In FIG. 6, it can be seen that the preparation of the MAT fiber optic cable 102 is identical to the embodiment of FIG. 4 previously described. The MAT fiber optic cable 102 is precision stripped and an O-ring 120, coupling nut 66 and compression sleeve are added to the cable. The DWT fiber optic cables 12 are also prepared in a manner identical to the embodiments of both FIG. 1 and FIG. 4, wherein each DWT fiber optic cable 12 is precision stripped, selectively electroplated and an O-ring 50, shrink wrap 65, compression sleeve and coupling nut 66 are added.

As with the previous embodiments, the splice housing assembly 200 includes a housing 202 that is divided longitudinally into two halves 204, 206. When assembled, the housing 202 is an elongated structure having two tapered ends. The MAT cable end 208 of the housing 202 is the same as was previously described in FIG. 4. The MAT cable end 208 of the housing 202 includes a central opening 210 for receiving the MAT fiber optic cable 102 and a second eccentric opening 212 for receiving a monel wire 108. A union tube bulkhead 135 is coupled to the housing 202 in the second eccentric opening 212, thereby providing a connection point for coupling the monel wire 108 to the splice housing assembly 200. The opposite DWT cable end 209 of the housing 202 has three entrance ports 211 for the three DWT fiber optic cables 12. However, the illustration of three DWT fiber optic cables is merely exemplary for the shown embodiment and any plurality could be used.

The O-ring 120 on the MAT fiber optic cable 102 and the O-rings 50 on the DWT fiber optic cables 12 seal with the housing 202 as the two halves 204, 206 of the housing 202 are mechanically joined. As with previous embodiments, two gasket grooves 214, 216 are formed on both halves 204, 206 of the housing 202. Elastomeric gaskets (not shown) are placed within the gasket grooves 214, 216, wherein the housing halves 204, 206 compress and seal with the gaskets when the housing 202 is assembled.

A three ported coupler 222 is provided that connects to all three of the DWT fiber optic cables 12. The three ported coupler 222 is a two-piece structure that closes around the three DWT fiber optic cables 12 in the section of the DWT fiber optic cable where the metal sheathing 17 (FIG. 2) has been electroplated. The three ported coupler 222 is conductive and electrically interconnects the metal sheathing 17 (FIG. 2) on the three DWT fiber optic cables 12 when joined around the three fiber optic cables 12. A conductive lead 146 joins to the three ported coupler 222 and electrically joins the three ported coupler 222 to the union tube bulkhead 135 at the far end of the housing 202. The conductive lead 146 joins to the union tube bulkhead 135 in the manner previously described, thereby electrically connecting the metal sheathing within the three DWT fiber optic cables 12 to the monel wire 108.

A grounding block 225 is provided that has three entrance ports at one end and a single entrance port at the opposite end. Connector firings 82 are coupled to the grounding block 225 at each port. The MAT fiber optic cable 102 and the three DWT fiber optic cables 12 join to the Founding block 225 in the same manner as has been previously described, wherein the fiber optic elements of each cable are advanced into the grounding block 225 and the cables are mechanically joined to the grounding block 225 by threading the coupling nuts 66 onto the connector fittings 82. The grounding block 225 contains the optical pathways that interconnect the fiber optic elements within the DWT fiber optic cables 12 to the fiber optic element within the MAT fiber optic cable 102. As a result, by properly installing the cables and joining the cables to the grounding block 225, a splice between the various fiber optics is accomplished.

Once assembled, the splice housing assembly 200 can still be opened and all connections repaired or adjusted. As a result, the splice can be tested prior to the addition of potting compound. Once it has been determined that the splice was properly made and no adjustments are required, a potting compound (not shown) is poured into the various filling ports as previously described. After the potting compound is cured, fill port caps are placed over the filling ports and the assembly is complete.

Figure 7:
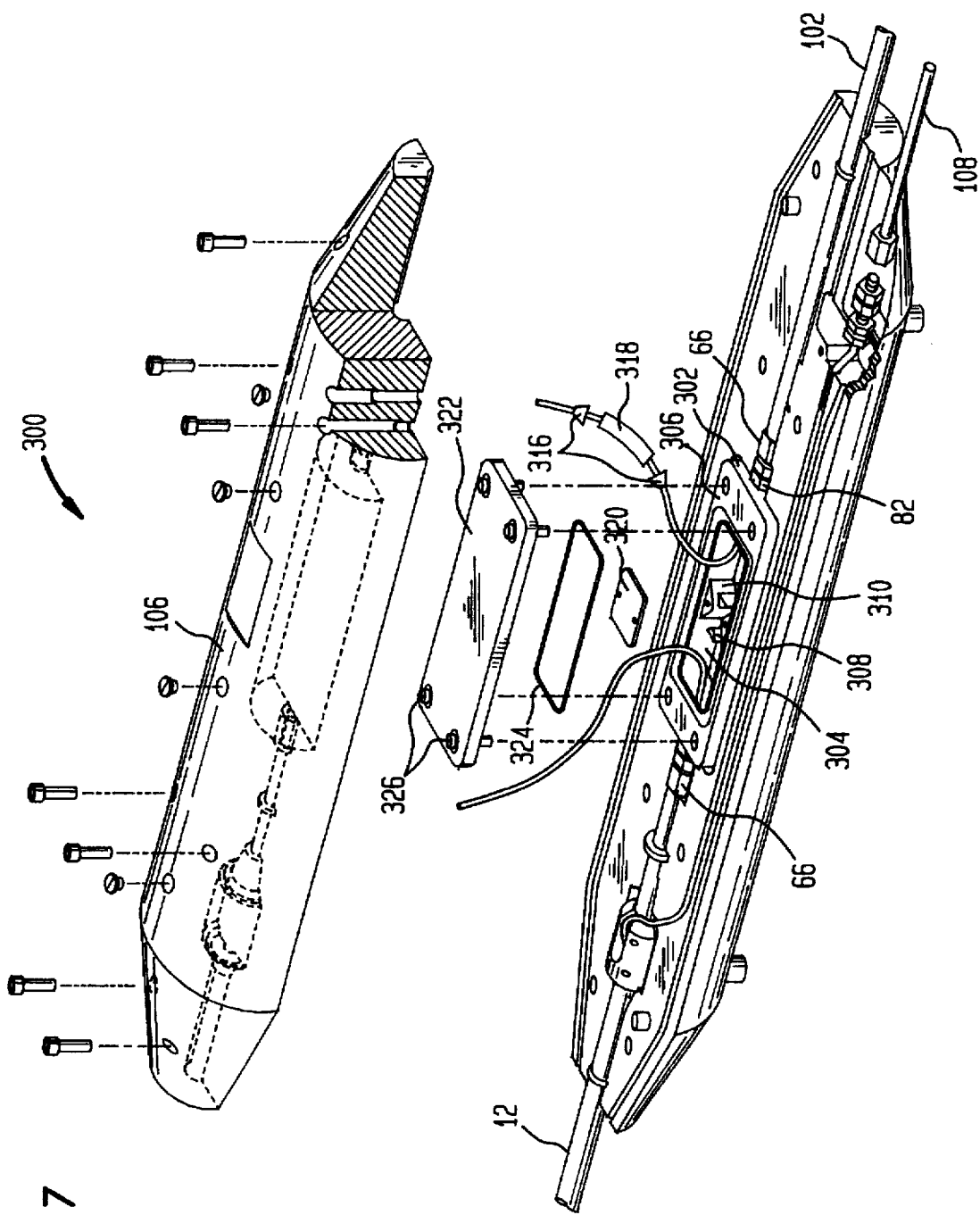
FIG. 7 is an exploded, perspective view of a fourth preferred embodiment of the present invention splice housing assembly, in an application where a DWT fiber optic cables is joined to a MAT fiber optic cable with a fusion splice.

Referring to FIG. 7 a fourth embodiment of the present invention splice housing assembly 300 is shown, wherein the splice housing assembly 300 is designed for the interconnection of a single DWT fiber optic cable 12 to a single MAT fiber optic cable 102 without the use of a prefabricated grounding block. Since the embodiment of FIG. 7 shares many of the components with he embodiment of FIG. 4 that was previously described, the components shared by FIG. 7 will be identified with the same reference numerals that were used in FIG. 4.

In FIG. 7, the housing 106 is identical to the embodiment of FIG. 4. Furthermore, the coupling of the metal sheathing within the DWT fiber optic cable 12 to the monel wire 108, via the two-piece coupler 70, conductive lead 146 and union tube bulkhead 135 are also identical to the embodiment of FIG. 4. The difference of the shown embodiment is the initial preparation of both the DWT fiber optic cable 12 and the MAT fiber optic cable 102 and the interconnection of the fiber optic elements contained within those cables.

Figure 8:
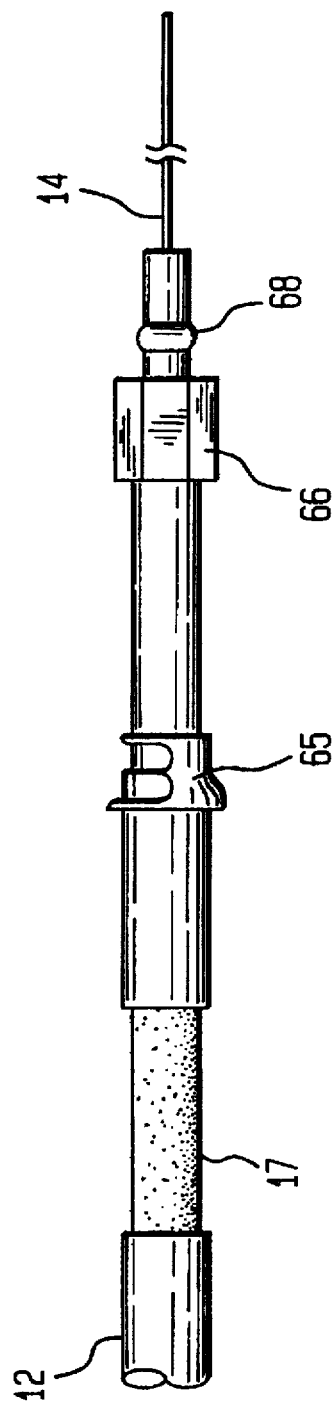
FIG. 8 is a side view illustrating the preparation of a DWT fiber optic cable for use in the splice housing assembly of FIG. 7.
Figure 9:
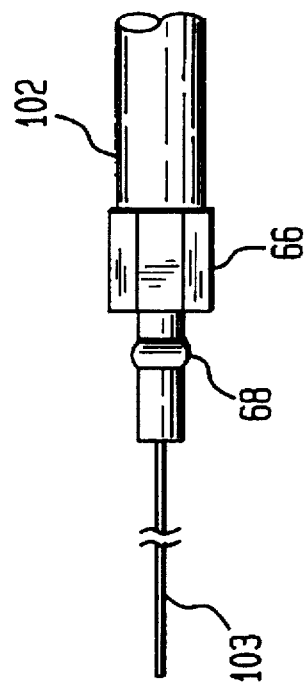
FIG. 9 is a side view illustrating the preparation of a MAT fiber optic cable for use in the splice housing assembly of FIG. 7.

Referring to FIGS. 8 and 9, it can be seen that in the initial preparation of the DWT fiber optic cable 12, approximately twenty six inches of the fiber optic element 14 are exposed by the removal of the various sheathing layers. The remainder of the DWT fiber optic cable 12 is prepared in the same manner as previous embodiments. Similarly, approximately twenty six inches of the fiber optic element 103 in the MAT fiber optic cable 102 are exposed. As with previous embodiments, shrink wrap 65, a coupling nut 66 and a compression sleeve 68 are added to DWT fiber optic cable 12. A portion of the metal sheathing 17 is exposed and is plated in gold. A coupling nut 66 and compression sleeve 68 are also added to the MAT fiber optic cable 102 in the same manner as previously described.

Figure 10:
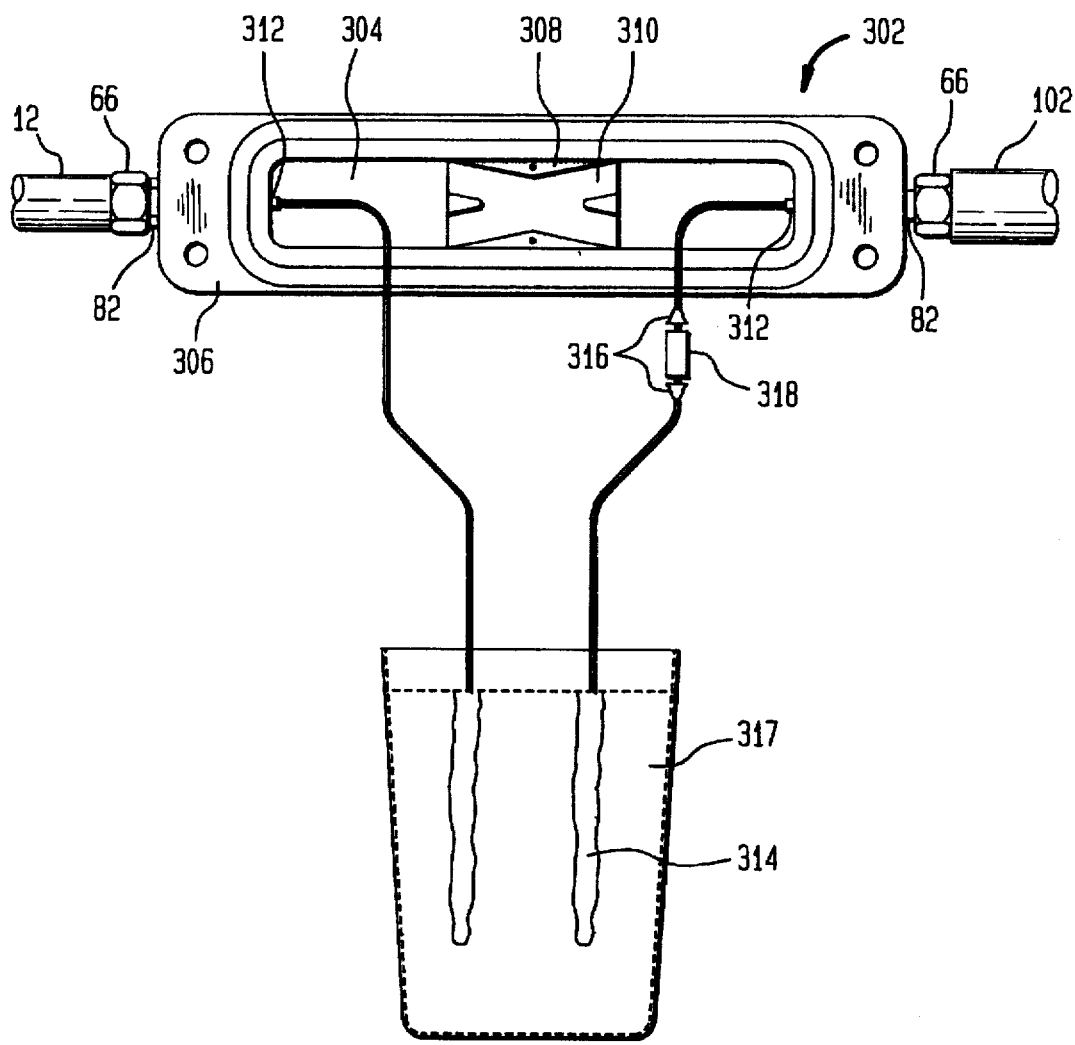
FIG. 10 shows the splice tray component of the splice housing assembly of FIG. 7, in conjunction with a volume of methylenechloride.

Referring to FIG. 10 in conjunction with FIG. 7, it can be seen that a splice tray 302 is disposed within the housing 106. The splice tray 302 is a hollow structure accessible through a large access port 304 on its top surface 306. A fiber guide 308 is contained within the splice tray 302, wherein the fiber guide 308 defines an X-shaped recess 310. Connector fittings 82 join to opposite sides of the fiber guide 308 and communicate with the interior of the splice tray 302. The long exposed segments of fiber optic element from both the DWT fiber optic cable 12 and the MAT fiber optic cable 102 are advanced through the connector firings 82 and into the splice tray 302. The DWT fiber optic cable 12 and the MAT fiber optic cable 102 are then physically joined to the splice tray 302 by the interconnection of the coupling nuts 66 to the connector fittings 82.

Using a conventional fiber optic stripping tool, two slits are formed in the nylon jacket 312 of both the DWT fiber optic element 14 and the MAT fiber optic element 103. The nylon jacket 312 is then peeled away and removed exposing the Hytrel coated fiber 314 contained in the center of both the DWT fiber optic cable 12 and the MAT fiber optic cable 102. Two segments of shrink wrap tubing 316 and a splice protector element 318 are slid onto one of the two Hytrel coated fibers 314. Each free end of the Hytrel coated fibers 314 is then placed in a volume of methylenechloride 317. The Hytrel coating 314 swells in the methylenechloride 317. The swelled Hytrel coating 314 is then stripped free of the below lying fiber optic element. The free ends of the fiber optic element are cut clean in a conventional cleaving device. The free ends are placed in a commercially available arc-fusion splicer machine such as that made by Fujikura of Japan. The arc-fusion splicer machine fuses the fiber optic elements together, thereby creating the desired splice. After the splice is complete, the splice protector element 318 is moved over the splice.

Figure 11:
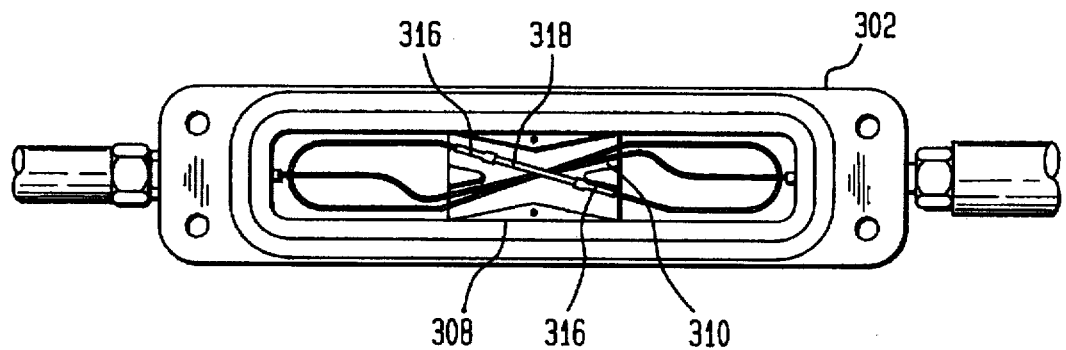
FIG. 11 shows the splice tray component of the splice housing assembly of FIG. 7, with the fiber optic elements spliced and wound therein.

Referring to FIG. 11, the segments of shrink wrap tubing 316 are positioned to overlap the ends of the splice protector element 318. The segments of shrink wrap tubing 316 are heated, wherein the shrink wrap tubing 316 joins to both the fiber optic element and the splice protector element 318. When the shrink wrap tubing 316 has cooled, the fiber optic element is wrapped around the fiber guide 308 in the splice tray 302. The X-shaped recess 310 in the fiber guide 308 enable the fibers to be wrapped in a figure eight pattern without violating a 0.69 inch minimum bend radius requirement of the fiber optic elements.

Returning to FIG. 7, a cap plate 320 is placed over the fiber guide 308. A cover 322 is then placed over the access port 304 wherein the cover 322 creates a hermetic seal with the splice tray 302 via a rubber seal 324. The threaded fasteners 326 used to join cover 322 to the splice tray 302 also anchor the splice tray 302 to the housing 106. Once the splice housing assembly 300 is fully assembled, a potting compound (not shown) is poured into the various filling ports as previously described. After the potting compound is cured, fill port caps are placed over the filling ports and the assembly is complete.

It will be understood that the various splice housing assemblies described herein are merely exemplary and that a person skilled in the art may make variations and modifications to the described embodiments using alternate components and embodiments. It should also be understood that features from the various described embodiments can be mixed into alternate embodiments not set forth herein. For example, the embodiment of FIG. 7 is described joining a DWT fiber optic cable to an MAT fiber optic cable. However, the same apparatus and procedure can also be used to join together two DWT fiber optic cables. All such variations and modifications are intended to be included within the scope of this invention as defined by the appended claims.

What is claimed is:

1. A splice housing device for connecting at least one first fiber optic element to a second fiber optic element, wherein each said first fiber optic element is surrounded by a casing that includes a conductive sheathing, said device comprising:

a housing having a first end and an opposite second end, wherein said housing includes a first section and a second section that join together along a common seam;

an optical coupling chamber defined within said housing between said first end and said second end;

a first sheathing coupling chamber defined within said housing between said optical coupling chamber and said first end;

at least one first conduit defined within said housing, wherein each said first conduit extends from said first end to said optical coupling chamber through said first sheathing coupling chamber and one said first fiber optic element passes through each said first conduit and extends into said optical coupling chamber;

a second conduit defined within said housing, wherein said second conduit extends from said second end to said optical coupling chamber and said second optic element passes through said second conduit and extends into said optical coupling chamber;

a grounding block contained within said internal chamber that optically couples each said first fiber optic element to said second fiber optic element; and a conductive element extending within said housing from said first sheathing coupling chamber to a connection point proximate said second end of said housing;

an electrical coupler for coupling the conductive sheathing surrounding each said first fiber optic element to said conductive element within said sheathing coupling chamber; and an electrical connecting means disposed at said connection point for joining said conductive element to an external element that extends away from said housing.

2. The device according to claim 1, further including at least one water impervious seal disposed between both said housing and each said first fiber optic element and said housing and said second fiber optic element.

3. The device according to claim 1, further including at least one seal disposed between said first section and said second section of said housing, wherein said at least one seal creates a water impervious joint between said first section and said second section when joined.

4. The device according to claim 1, further including threaded fittings for threadably coupling each said first optical fiber and said second optical fiber to said grounding block.

5. The device according to claim 1, wherein the second fiber optic element has a casing that includes a metal sheathing which serves as said external element, and said electrical coupling means electrically couples said metal sheathing to said conductive element, thereby creating an electrical connection between the conductive sheathing of each said first fiber optic element and said metal sheathing of said second fiber optic element.

6. The device according to claim 1, further including a wire connector that extends through said second end of said housing to a point on an exterior surface of said housing wherein said wire connector joins to said conductive element at said connection point in said housing.

7. The device according to claim 1, wherein said housing includes filling ports that communicate with said optical coupling chamber and said sheathing coupling chamber, thereby enabling an encapsulation compound to be added to said housing and fill both said optical coupling chamber and said sheathing coupling chamber.

8. A method of coupling at least one first fiber optic element to at least one second fiber optic element, wherein said at least one first fiber optic element is surrounded by a casing that includes a conductive sheathing, said method comprising the steps of:

providing a water impermeable housing that defines a optical coupling chamber therein;

optically joining said at least one first fiber optic element to said at least one second fiber optic element within said optical coupling chamber by mechanically joining said at least one first fiber optic element and said at least one second fiber optic element to a grounding block;

exposing a segment of the conductive sheathing of each said first optical fiber within said housing on one side of said optical connection chamber;

joining a conductive element to each said segment of conductive sheathing, wherein each said conductive element extends past said optical coupling chamber to a connection point on an opposite side of said optical connection chamber; and providing a connector at said connection point for joining said conductive element to an external element that extends away from said housing.

9. The method according to claim 8, wherein said second fiber optic element is surrounded by a casing having a metal sheathing contained therein, and said method further includes the step of electrically interconnecting said metal sheathing to said conductive element at said connection point within said housing.

10. The method according to claim 8, wherein said connector extends from said connection point in said housing to a point external of said housing.

11. The method according to claim 8 wherein said housing is comprised of two housing halves, wherein said two housing halves creates a water impervious seal against each other and against both said first fiber optic element and said second fiber optic element when said two housing halves are affixed to each other.

* * * * *